US012129771B1

United States Patent
West et al.

(10) Patent No.: US 12,129,771 B1
(45) Date of Patent: Oct. 29, 2024

(54) STATOR VANE ASSEMBLY HAVING MECHANICAL RETENTION DEVICE

(71) Applicant: GE Infrastructure Technology LLC, Greenville, SC (US)

(72) Inventors: Christopher West, Greenville, SC (US); Zachary John Snider, Simpsonville, SC (US); Brad Wilson VanTassel, Greer, SC (US); Matthew Troy Hafner, Honea Path, SC (US); John Ellington Greene, Greenville, SC (US); Richard Martin DiCintio, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/453,694

(22) Filed: Aug. 22, 2023

(51) Int. Cl.
*F01D 9/04* (2006.01)
*F02C 3/04* (2006.01)

(52) U.S. Cl.
CPC ............. *F01D 9/042* (2013.01); *F02C 3/04* (2013.01); *F05D 2260/30* (2013.01)

(58) Field of Classification Search
CPC . F01D 9/04; F01D 9/042; F01D 9/044; F01D 25/246; F02C 3/04; F05D 2260/30; F05D 2260/31
See application file for complete search history.

(56) References Cited

U.S. PATENT DOCUMENTS

| | | | |
|---|---|---|---|
| 3,443,791 A * | 5/1969 | Freeman, Jr. | ........... F01D 9/042 415/115 |
| 4,288,201 A | 9/1981 | Wilson | |
| 5,332,360 A | 7/1994 | Correia et al. | |
| 5,732,468 A | 3/1998 | Galley et al. | |
| 5,797,725 A | 8/1998 | Rhodes | |
| 6,416,278 B1 | 7/2002 | Caddell, Jr. et al. | |
| 8,998,566 B2 | 4/2015 | Justl et al. | |
| 9,611,748 B2 | 4/2017 | Kington et al. | |
| 9,702,252 B2 | 7/2017 | Kanjiyani et al. | |
| 10,280,793 B2 | 5/2019 | Vu | |
| 10,392,950 B2 | 8/2019 | Correia et al. | |
| 10,436,040 B2 | 10/2019 | Rhodes et al. | |
| 10,655,482 B2 | 5/2020 | Freeman et al. | |
| 11,359,502 B2 | 6/2022 | Kittleson | |
| 11,466,581 B1 | 10/2022 | Snider et al. | |
| 11,492,917 B2 | 11/2022 | Kittleson et al. | |
| 2001/0021342 A1 | 9/2001 | Taeck | |
| 2003/0082048 A1 | 5/2003 | Jackson et al. | |
| 2003/0082053 A1 | 5/2003 | Jackson et al. | |
| 2007/0163114 A1 | 7/2007 | Johnson | |
| 2011/0058953 A1 | 3/2011 | Simon-Delgado et al. | |
| 2013/0121833 A1* | 5/2013 | Lucashu | ................... F01D 9/04 416/204 R |

(Continued)

*Primary Examiner* — Steven M Sutherland
(74) *Attorney, Agent, or Firm* — Dority & Manning, P.A.

(57) ABSTRACT

A stator vane assembly includes a platform that defines an opening. The stator vane assembly further includes an airfoil segment that includes an airfoil and a boss. The airfoil includes a leading edge, a trailing edge, a suction side wall, and a pressure side wall. The airfoil extends radially between a base and a tip. The boss extends from at least one of the base or the tip of the airfoil. The boss is disposed in the opening of the platform. The stator vane assembly further includes a mechanical retention device that couples the platform to the boss of the airfoil segment.

18 Claims, 8 Drawing Sheets

(56) References Cited

U.S. PATENT DOCUMENTS

| | | | |
|---|---|---|---|
| 2013/0202409 A1* | 8/2013 | Jones | F01D 5/189 29/889 |
| 2014/0334914 A1 | 11/2014 | Brandl et al. | |
| 2015/0028021 A1 | 1/2015 | Beckel et al. | |
| 2016/0003051 A1 | 1/2016 | Slavens et al. | |
| 2016/0053622 A1 | 2/2016 | Farah et al. | |
| 2016/0177749 A1 | 6/2016 | Brandl et al. | |
| 2017/0145923 A1 | 5/2017 | Spangler et al. | |
| 2017/0312858 A1 | 11/2017 | Eriksson et al. | |
| 2017/0333995 A1 | 11/2017 | Ott et al. | |
| 2018/0010460 A1 | 1/2018 | Tsukimoto et al. | |
| 2018/0209283 A1 | 7/2018 | Kottilingam et al. | |
| 2020/0141256 A1 | 5/2020 | Broomer et al. | |
| 2020/0173288 A1 | 6/2020 | Honkomp et al. | |
| 2021/0017868 A1 | 1/2021 | Kottilingam et al. | |

* cited by examiner

STATOR VANE ASSEMBLY HAVING MECHANICAL RETENTION DEVICE

STATEMENT REGARDING FEDERALLY SPONSORED RESEARCH OR DEVELOPMENT

This invention was made with Government support under Contract No. DE-FE0031611 awarded by the United States Department of Energy. The Government has certain rights in this invention.

FIELD

The present disclosure relates generally to a stator vane having multiple components joined together via a mechanical retention device.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The spent combustion gases then exit the turbine section via the exhaust section.

During operation of the turbomachine, various hot gas path components in the system are subjected to high temperature flows, which can cause the hot gas path components to fail. Since higher temperature flows generally result in increased performance, efficiency, and power output of the turbomachine, the hot gas path components that are subjected to high temperature flows must be cooled to allow the gas turbine system to operate with flows at increased temperatures.

As the maximum local temperature of the hot gas path components approaches the melting temperature of the hot gas path components, forced air cooling becomes necessary. For this reason, airfoils of turbine rotor blades and stationary nozzles often require complex cooling schemes in which air, typically bleed air from the compressor section, is forced through internal cooling passages within the airfoil and then discharged through cooling holes at the airfoil surface to transfer heat from the hot gas path component.

Many complex cooling schemes use small cooling passages, or micro-channels, to deliver cooling fluid through the airfoil. Such cooling schemes present a considerable fabrication challenge for cores and castings, which can significantly increase the manufacturing cost of the hot gas path components using such known near wall cooling systems. To address the fabrication challenges with complex and/or small cooling channels near the component surface, many hot gas path components with such features may be additively manufactured. Additive manufacturing is capable of producing components with intricate and varied cooling features. However, additively manufacturing a hot gas path component, such as a rotor blade or stator vane, as a single component may be costly and time-consuming. Additionally, manufacturing errors in a single portion of the hot gas path component may result in the scrapping of the entire component.

As such, manufacturing a hot gas path component as multiple sub-components may be advantageous. However, due to the complex geometries of the sub-components, joining the sub-components to form the hot gas path component may be difficult. Additionally, the joints formed between the sub-components may be particularly weak and/or fail when exposed to the hot combustion gases produced during operation of the turbomachine and transmitted through the hot gas path through the turbine section.

Accordingly, an improved hot gas path component, having one or more subcomponents joined together and capable of withstanding hot combustion gases without risk of joint failure, is desired and would be appreciated in the art.

BRIEF DESCRIPTION

Aspects and advantages of the stator vane assemblies and turbomachines in accordance with the present disclosure will be set forth in part in the following description, or may be obvious from the description, or may be learned through practice of the technology.

In accordance with one embodiment, a stator vane assembly is provided. A stator vane assembly includes a platform that defines an opening. The stator vane assembly further includes an airfoil segment that includes an airfoil and a boss. The airfoil includes a leading edge, a trailing edge, a suction side wall, and a pressure side wall. The airfoil extends radially between a base and a tip. The boss extends from at least one of the base or the tip of the airfoil. The boss is disposed in the opening of the platform. The stator vane assembly further includes a mechanical retention device that couples the platform to the boss of the airfoil segment.

In accordance with another embodiment, a turbomachine is provided. The turbomachine defines an axial direction, a radial direction, and a circumferential direction. The turbomachine includes a compressor section, a combustion section, and a turbine section. At least one of the compressor section or the turbine section includes a stator vane assembly. The stator vane assembly includes a platform that defines an opening. The stator vane assembly further includes an airfoil segment that includes an airfoil and a boss. The airfoil includes a leading edge, a trailing edge, a suction side wall, and a pressure side wall. The airfoil extends radially between a base and a tip. The boss extends from at least one of the base or the tip of the airfoil. The boss is disposed in the opening of the platform. The stator vane assembly further includes a mechanical retention device that couples the platform to the boss of the airfoil segment.

These and other features, aspects and advantages of the present stator vane assemblies and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present stator vane assemblies and turbomachines, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present stator vane assemblies and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that two or more areas defining a flow passage are joined to one another such that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component; the term "axially" refers to the relative direction that is substantially parallel and/or coaxially aligned to an axial centerline of a particular component; and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. The terms "directly coupled," "directly fixed," "directly attached to," and the like mean that two components are joined in contact with one another and that no intermediate components or features are present.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features that are not expressly listed or that are inherent to such process, method, article, or apparatus. Further, unless expressly stated to the contrary, "and/or" refers to a condition satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The phrase "proximate to" refers to being closer to one end than an opposite end. For example, when used in conjunction with first and second ends; high pressure and low pressure sides; leading edge and trailing edge; or the like, the phrase "proximate to the first end," or "proximate to the high pressure side," refers to a location closer to the first end than the second end, or closer to the high pressure side than the low pressure side, respectively.

As used herein, "solid" may refer to a component that is free from voids, cavities, holes, or other openings, such that the component is impermeable and does not allow air or other fluids to pass therethrough.

Figure 1:
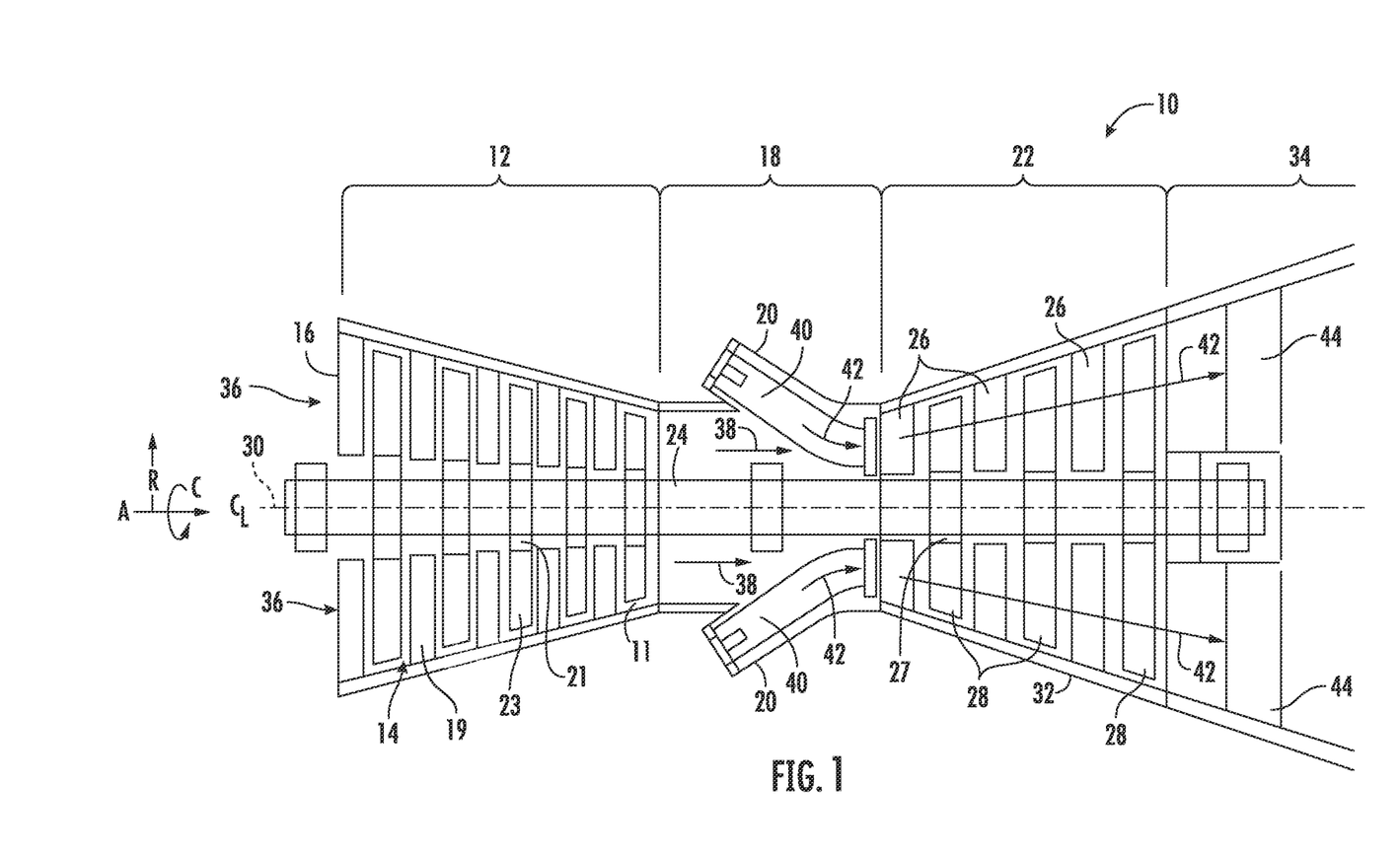
FIG. 1 is a schematic illustration of a turbomachine (e.g., a gas turbine engine), in accordance with embodiments of the present disclosure.

Referring now to the drawings, FIG. 1 illustrates a schematic diagram of one embodiment of a turbomachine, which in the illustrated embodiment is a gas turbine engine 10. Although an industrial or land-based gas turbine engine is shown and described herein, the present disclosure is not limited to an industrial or land-based gas turbine engine, unless otherwise specified in the claims. For example, the invention as described herein may be used in any type of turbomachine including, but not limited to, a steam turbine, an aircraft gas turbine, or a marine gas turbine.

As shown in FIG. 1, the gas turbine engine 10 generally includes a compressor section 12. The compressor section 12 includes a compressor 14. The compressor section 12 includes an inlet 16 that is disposed at an upstream end of the gas turbine engine 10. The gas turbine engine 10 further includes a combustion section 18 having one or more combustors 20 disposed downstream from the compressor section 12. The gas turbine engine 10 further includes a turbine section 22 (i.e., an expansion turbine) that is downstream from the combustion section 18. A shaft 24 extends generally axially through the gas turbine engine 10.

The compressor section 12 may generally include a plurality of rotor disks 21 and a plurality of rotor blades 23 extending radially outwardly from and connected to each rotor disk 21. Each rotor disk 21 in turn may be coupled to or form a portion of the shaft 24 that extends through the compressor section 12. The rotor blades 23 of the compressor section 12 may include turbomachine airfoils that define an airfoil shape (e.g., having a leading edge, a trailing edge, and side walls extending between the leading edge and the trailing edge). Additionally, in many embodiments, the compressor section 12 may include stator vanes 19 disposed between the rotor blades 23. The stator vanes 19 may extend from, and couple to, a compressor casing 11.

The turbine section 22 may generally include a plurality of rotor disks 27 and a plurality of rotor blades 28 extending radially outwardly from and being interconnected to each rotor disk 27. Each rotor disk 27 in turn may be coupled to or form a portion of the shaft 24 that extends through the turbine section 22. The turbine section 22 further includes an outer casing 32 that circumferentially surrounds the portion of the shaft 24 and the rotor blades 28. The turbine section 22 may include stator vanes or stationary nozzles 26 extending radially inward from the outer casing 32. The rotor blades 28 and stator vanes 26 may be arranged in alternating fashion in stages along an axial centerline 30 of gas turbine 10. Both the rotor blades 28 and the stator vanes 26 may include turbomachine airfoils that define an airfoil shape (e.g., having a leading edge, a trailing edge, and side walls extending between the leading edge and the trailing edge).

In operation, ambient air 36 or other working fluid is drawn into the inlet 16 of the compressor 14 and is progressively compressed to provide a compressed air 38 to the combustion section 18. The compressed air 38 flows into the combustion section 18 and is mixed with fuel to form a combustible mixture. The combustible mixture is burned within a combustion chamber 40 of the combustor 20, thereby generating combustion gases 42 that flow from the combustion chamber 40 into the turbine section 22. Energy (kinetic and/or thermal) is transferred from the combustion gases 42 to the rotor blades 28, causing the shaft 24 to rotate and produce mechanical work. The spent combustion gases 42 (also called "exhaust gases") exit the turbine section 22 and flow through the exhaust diffuser 34 across a plurality of struts or main airfoils 44 that are disposed within the exhaust diffuser 34.

The gas turbine 10 may define a cylindrical coordinate system having an axial direction A extending along the axial centerline 30, a radial direction R perpendicular to the axial centerline 30, and a circumferential direction C extending around the axial centerline 30.

Figure 2:
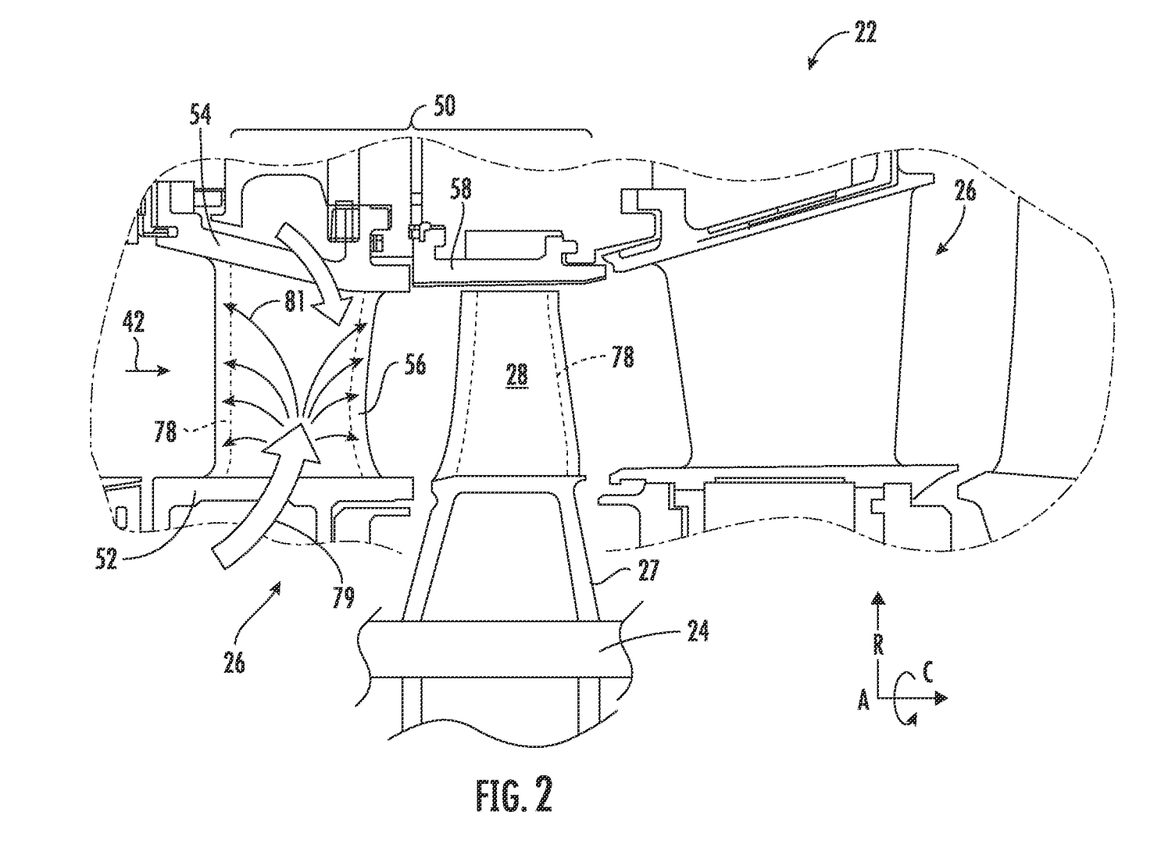
FIG. 2 illustrates a partial cross-sectional side view of a turbine section of a gas turbine engine as shown in FIG. 1, in accordance with embodiments of the present disclosure.

FIG. 2 is a partial cross-sectional side view of the turbine section 22 of the gas turbine engine 10, in accordance with embodiments of the present disclosure. The turbine section 22 may include one or more stages 50 that each include a set of rotor blades 28 coupled to a rotor disk 27 that may be rotatably attached to the shaft 24. Each stage of the one or more stages 50 further includes a set of stator vanes 26 axially adjacent to the set of rotor blades 28. The stator vane 26 described herein may be employed in a first stage, a second stage, a third stage, a fourth stage, or multiple stages thereof, in which "first stage" refers to the stage immediately downstream of the combustion section 18.

Each stator vane 26 may include at least one airfoil 56 that extends in the radial direction R between an inner platform or endwall 52 and an outer platform or endwall 54. The circumferentially adjacent outer platforms 54 of each stator vane 26 may be coupled together to form an outer annular ring extending around an inner annular ring formed by the circumferentially adjacent inner platforms 52 of each stator vane 26. The at least one airfoil 56 may extend between the two annular rings formed by the platforms 52, 54. The turbine section 22 may also include shroud segments 58, which may be disposed downstream of the outer platform 54 to direct combustion gases 42 flowing past the stator vanes 26 to the rotor blades 28.

Structures or components disposed along the flow path of the combustion gases 42 may be referred to as hot gas path components. In one example, the hot gas path component may be the stator vane 26 and/or the rotor blade 28. In some embodiments, to cool the hot gas path components, cooling features, such as impingement sleeves, cooling channels, cooling holes, etc. may be disposed within the hot gas path components, as indicated by the dashed line 78. For example, cooling air as indicated by an arrow 79 may be routed from the compressor section 12 or elsewhere and directed through the cooling features as indicated by arrows 81. While such cooling flows are shown in FIG. 2 with respect to the stator vane 2, it should be understood that similar cooling flows may be used for the rotor blade 28.

Figure 3:
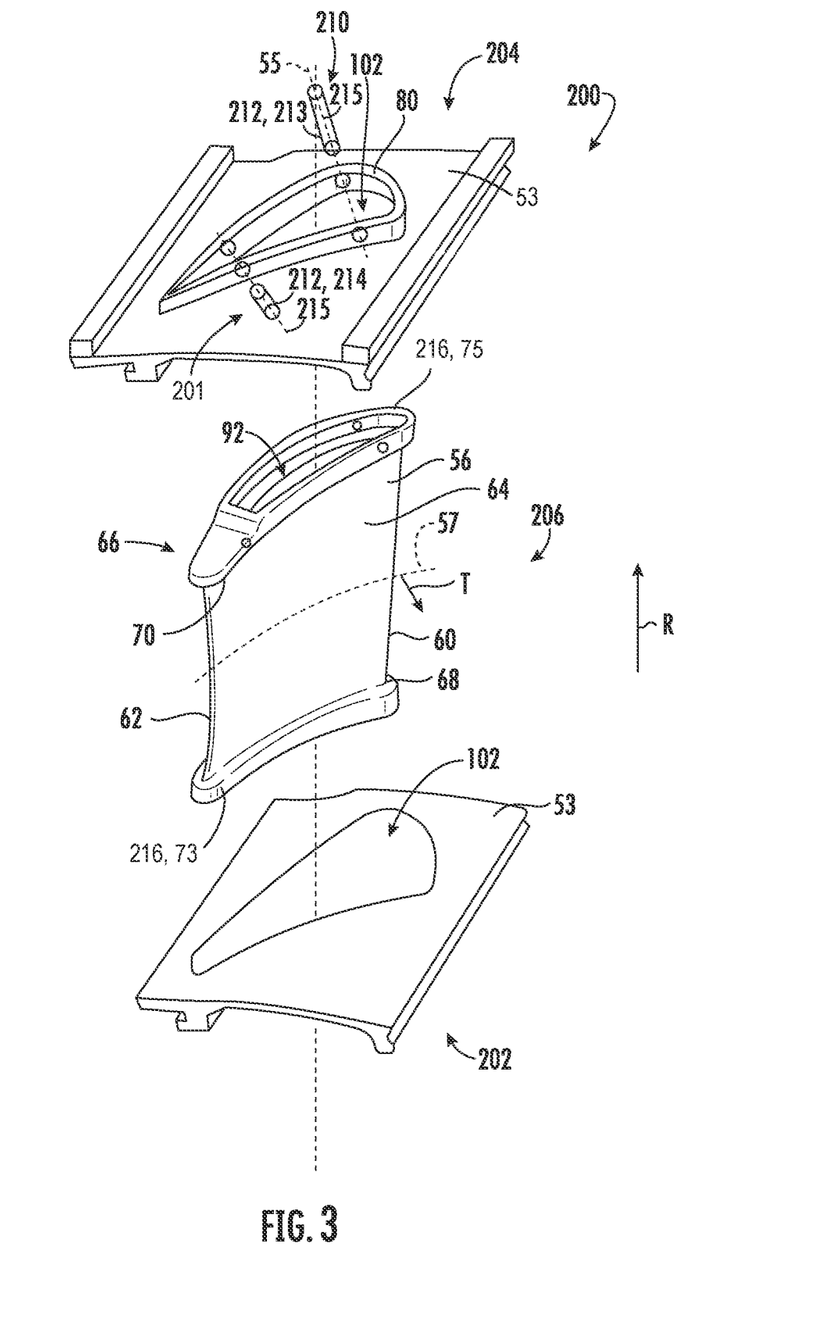
FIG. 3 illustrates an exploded view of a stator vane, in accordance with embodiments of the present disclosure.

FIG. 3 illustrates an exploded view of a stator vane assembly 200, which may be representative of the stator vane 19 in the compressor section 12 and/or the stator vane 26 in the turbine section 22. However, in exemplary embodiments, the stator vane assembly 200 may be a stator vane 26 in the turbine section 22. As shown in FIG. 3, the stator vane assembly 200 includes a platform 201 and an airfoil segment 206. For example, the stator vane assembly 200 may include an inner platform 202, an outer platform 204, and the airfoil segment 206, which are separated from one another along an axial centerline 55 of the stator vane assembly 200, in order to illustrate various features of the stator vane assembly 200 that could not otherwise be seen when the assembly is constructed. The axial centerline 55 may be generally parallel to the radial direction of the gas turbine 10 when the stator vane assembly 200 is installed in the turbine section 22. The airfoil segment 206 may include an airfoil 56 that generally defines an aerodynamic shape or contour. For example, the airfoil 56 may include a leading edge 60 that engages a flow of combustion gases and side walls that guide the combustion gases along the airfoil 56 to a trailing edge 62. For example, the airfoil 56 may include a pressure side wall 64 and a suction side wall 66 that each extend from the leading edge 60 to the trailing edge 62. Additionally, the airfoil 56 may extend radially between a base 68 and a tip 70.

In exemplary embodiments, the inner platform 202, the airfoil 56, and the outer platform 204 may be separate components (e.g., manufactured as separate components) that are coupled to one another via a mechanical retention device 210. In exemplary embodiments, the mechanical retention device 210 may include one or more retention pins 212 extending through the platform 201 and a boss 216 of the airfoil segment 206. In some embodiments, the one or more retention pins 212 may include a leading edge pin 213 and a trailing edge pin 214.

While exemplary embodiments of the present stator vane assembly 200 include mechanical retention devices 210 in the form of one or more retention pins 212 (which advantageously provide for ease of assembly), it should be appreciated that other mechanical retention devices may be used without departing from the scope of the present disclosure. For example, in other embodiments, the mechanical retention device 210 may include one or more of shear keys, snap rings, a machined tongue and groove, or others. The present disclosure should not be limited to embodiments having one or more retention pins as the mechanical retention device unless explicitly recited in the claims.

The one or more retention pins 212 may each be solid (e.g., not hollow or including voids), cylindrically shaped pins. With this shape, each of the retention pins 212 may extend linearly along a centerline 215, and each of the retention pins 212 may have a circular cross-sectional shape. However, in other embodiments, the retention pins 212 may have other cross-sectional shapes, and the present disclosure should not be limited to any particular shape unless specifically recited in the claims. In various embodiments, the one or more retention pins 212 may be formed from a metal (such as a nickel superalloy or other metal or other metal alloy). However, in other embodiments, the retention pins 212 may be formed from another material, such as ceramic, and the pins of the present disclosure should not be limited to any particular material unless specifically recited in the claims.

For example, in particular embodiments, the inner platform 202, the airfoil 56, and the outer platform 204 may each be separately additively manufactured (e.g., 3D printed) and subsequently joined to one another via the mechanical retention device 210 and/or via one or more metallurgical bonds. In various embodiments, metallurgical bonds may include a weld joint, a braze joint, a sintered joint, or others. In exemplary embodiments, the metallurgical bond may be a braze joint. Forming the stator vane assembly 200 as three separate components advantageously increases the repairability of the stator vane assembly 200. For example, if a portion of the airfoil segment 206 is damaged, then the entire stator vane assembly 200 would not need to be replaced. Rather, the mechanical connection could be undone (e.g., by removing the one or more pins 212) and metallurgical connection could be undone (e.g., via reheating and melting the components apart) to decouple the airfoil segment 206 from the platforms 202, 204, and a new airfoil segment 206 could be employed or the old airfoil could be repaired.

Additionally, in instances where additive manufacturing is used to produce some portion of or all of the stator vane assembly 200, the build (i.e., print) time of the airfoil segment 206 as a separate component from the inner platform 202 and the outer platform 204 is significantly shorter as compared to the build time of an integral nozzle in which the inner and outer platforms 202, 204 are printed with the airfoil segment 206. Moreover, forming the stator vane assembly 200 from three separate components simplifies the build process and permits different manufacturing techniques and/or different materials to be used for the various components.

As shown in FIG. 3, the airfoil segment 206 may include a camber axis 57, which may extend from the leading edge 60 to the trailing edge 62 and which may be defined halfway between the pressure side wall 64 and the suction side wall 66 of the airfoil 56. The camber axis 57 may be curved and/or contoured to correspond with the curve of the pressure side wall 64 and the suction side wall 66. A transverse direction T may be defined orthogonally with respect to the camber axis 57.

As shown in FIG. 3, the airfoil segment 206 may further include the boss 216 extending from at least one of the base 68 or the tip 70 of the airfoil 56. The boss 216 may extend outwardly from the airfoil 56 in both the radial direction R and in the transverse direction T. For example, the stator vane assembly 200 may include an inner boss 73 that extends radially inwardly from the airfoil 56 at the base 68 and an outer boss 75 that extends radially outwardly from the airfoil 56 at the tip 70. Each boss 73, 75 may extend generally perpendicularly from the pressure side wall 64 and the suction side wall 66 in the transverse direction T.

Both the inner platform 202 and the outer platform 204 may define an opening 102. The boss 216 is disposed in the opening 102 of the platform 202,204. The opening 102 may be sized and shaped to correspond with the respective boss 73, 75, such that the respective boss 73, 75 may be inserted into the opening 102 (and subsequently connected to the respective platform 202, 204 via the mechanical retention device 208 and/or a brazed connection), thereby coupling the airfoil segment 206 to the inner platform 202 and the outer platform 204. Particularly, the inner boss 73 may be inserted into the opening 102 of the inner platform 202 (and subsequently connected to the inner platform 202), and the outer boss 75 may be inserted into the opening 102 of the outer platform 204 (and subsequently connected to the outer platform 204).

Figure 6:
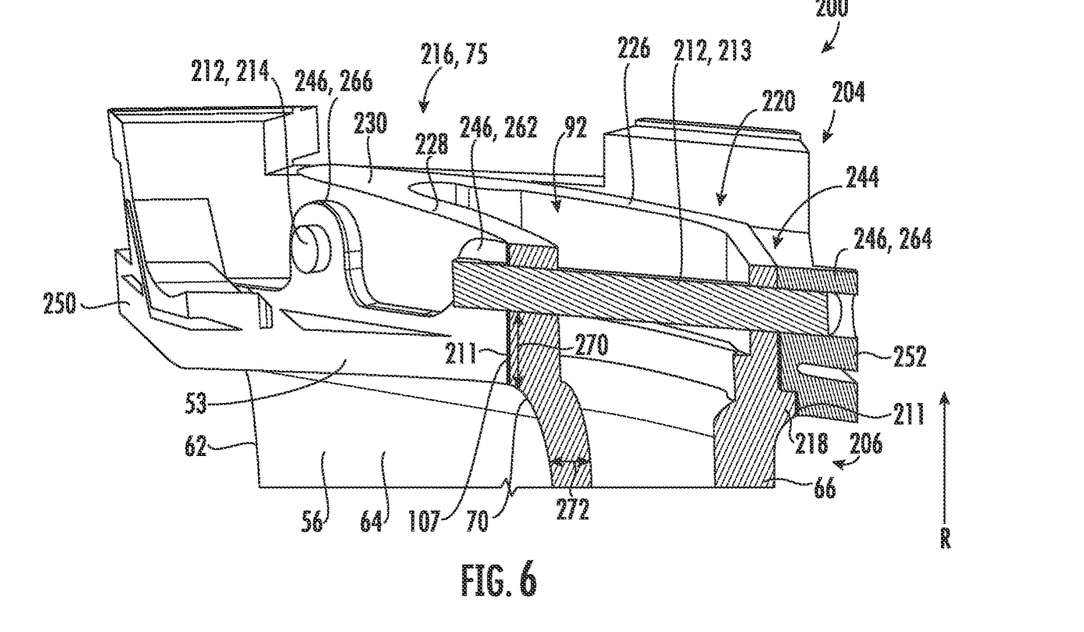
FIG. 6 illustrates a perspective cross-sectional view of the stator vane assembly from along the line 6-6 shown in FIG. 5 in accordance with exemplary embodiments of the present disclosure.
Figure 10:
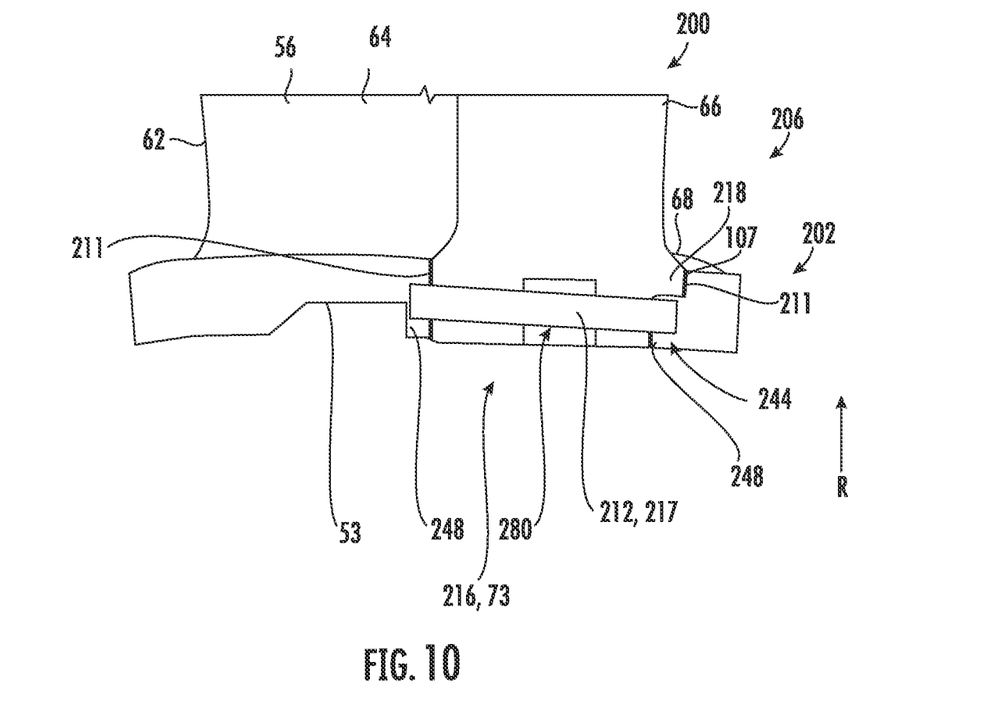
FIG. 10 illustrates a perspective cross-sectional view of the stator vane assembly from along the line 10-10 shown in FIG. 9 in accordance with exemplary embodiments of the present disclosure.

In many embodiments, in addition to the mechanical retention device 208, or as an alternative to the mechanical retention device 208, the boss 216 of the airfoil segment 206 may be brazedly coupled to the inner and outer platforms 52 and 54 via a metallurgical bond 211 (FIGS. 6 and 10). In exemplary embodiments, the metallurgical bond 211 may be a braze joint. In such embodiments, a braze material 107 may be disposed between the boss 216 and the boundary of the opening 102 (at both the inner and outer platforms 202 and 204). The entire stator vane assembly 200 may then be placed in a braze oven to melt the braze material 107, and subsequently the braze material 107 may solidify, thereby joining the inner and outer platforms 202 and 204 to a respective boss 216 of the airfoil segment 206. The braze material 107 may contain copper, nickel, silver, gold, aluminum, or other suitable braze metals.

In many embodiments, as shown in FIG. 3, the inner platform 202 and/or the outer platform 204 includes a floor 53. The floor 53 may extend generally perpendicularly to the airfoil 56. The floor 53 of the inner platform 202 may define a radially inward flow boundary for combustion gases in the turbine section 22. Similarly, the floor 53 of the outer platform 204 may define a radially outer flow boundary for combustion gases in the turbine section 22. Additionally, the floors 53 of the inner platform 202 and the outer platform 204 may at least partially define the respective openings 102. In exemplary embodiments, one or both of the inner platform 202 and/or the outer platform 204 may include one or more protrusions 80 extending radially from the floor 53. The one or more protrusions 80 may at least partially define the opening 102. In many embodiments, the boss 216 may be brazedly coupled to the one or more protrusions 80.

In some embodiments, as shown in FIG. 3, the one or more protrusions 80 may be a singular protrusion 80 that annularly surrounds the opening 102. However, in other embodiments, the one or more protrusions 80 may include a plurality of protrusions 80 spaced apart from one another and disposed in a discontinuous manner about the opening 102.

In certain embodiments, the boss 73, 216 that extends from the base 68 of the airfoil 56 may extend into the opening 102 of the inner platform 202 such that the inner platform 202 surrounds the boss 73, 216 of the airfoil 56. Particularly, the floor 53 and/or the one or more protrusions 80 of the inner platform 202 may surround the boss 73, 216 extending from the base 68 of the airfoil 56. Similarly, the boss 75, 216 that extends from the tip 70 of the airfoil 56 may extend into the opening 102 of the outer platform 204 such that the outer platform 204 surrounds the boss 75, 216 of the airfoil 56. Particularly, the floor 53 and/or the one or more protrusions 80 of the outer platform 204 may surround the boss 75, 216 extending from the tip 70 of the airfoil 56.

In some embodiments, as shown, the boss 216 may at least partially define a cavity 92 that extends into and is further defined in the airfoil 56. The cavity 92 may be exposed by the opening 102 of the platform 54, such that air (e.g., bleed air from the compressor 14) may enter the cavity 92. In other embodiments (not shown), the boss 216 may be solid (i.e., no voids, cavities, or openings defined therein).

Figure 4:
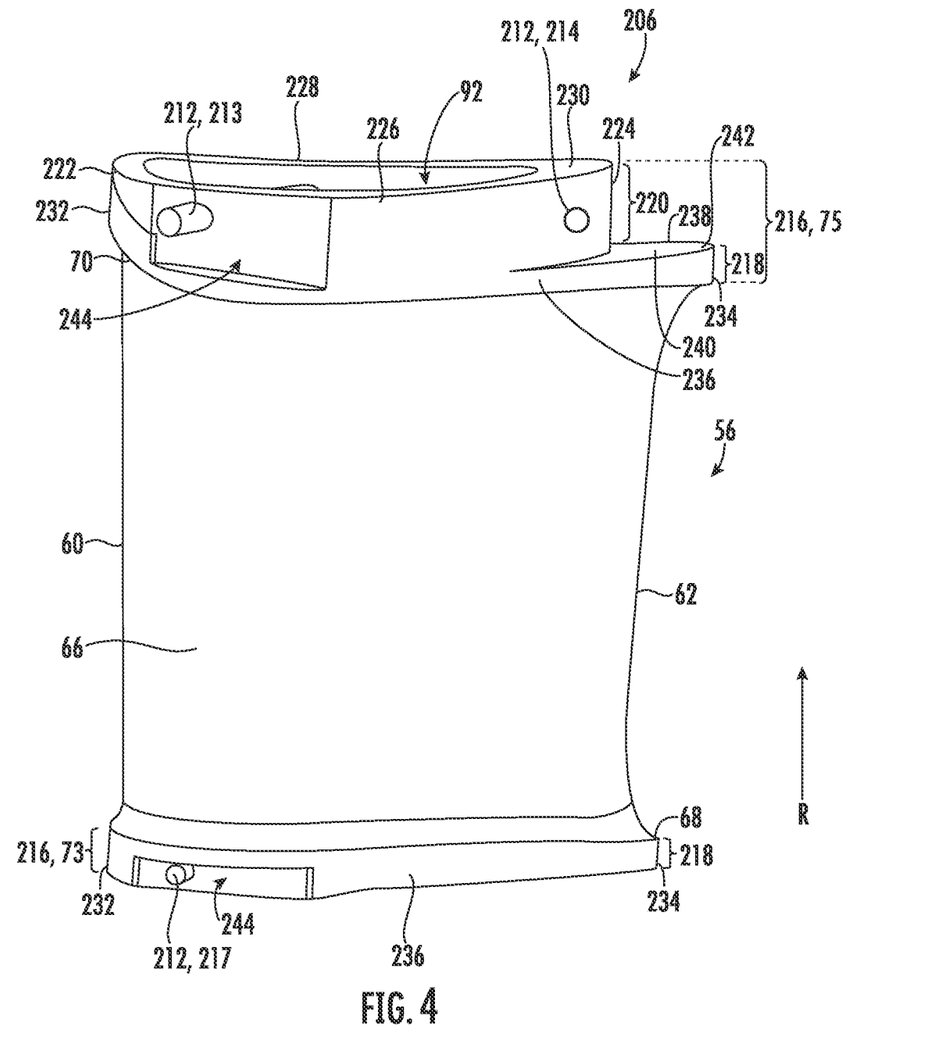
FIG. 4 illustrates a perspective view of an airfoil segment in accordance with an exemplary aspect of the present disclosure.

Referring now to FIG. 4, a perspective view of an airfoil segment 206 is illustrated in accordance with embodiments of the present disclosure. As shown, the airfoil segment 206 may include airfoil 56 and at least one boss 216. The airfoil 56 may include a leading edge 60 that engages a working fluid and a trailing edge 62 opposite the leading edge 60. Additionally, the airfoil 56 may include a pressure side wall 64 (FIG. 3) and a suction side wall 66 that each extend from the leading edge 60 to the trailing edge 62. The airfoil 56 may extend radially between a base 68 and a tip 70. In many embodiments, the boss 216 may extend from at least one of the base 68 or the tip 70 of the airfoil 56. Particularly, in exemplary embodiments, a boss 216 may extend from both the base 68 and the tip 70. In such embodiments, the airfoil segment 206 may include an inner boss 73 extending radially inward from the base 68 and an outer boss 75 extending radially outwardly from the tip 70. The inner boss 73 and the outer boss 75 may be of different radial heights and may include different features, which are discussed as follows.

In many embodiments, the boss 216 may include a shoulder portion 218 and a shank portion 220. The shoulder portion 218 may extend (e.g., radially) from, and surround, the tip 70 of the airfoil 56. Particularly, the outer boss 75 may include both the shoulder portion 218 and the shank portion 220, and the inner boss 73 may only include the shoulder portion 218 (without a shank portion). The shank portion 220 may extend radially (e.g., radially outwardly) from the shoulder portion 218. As shown in FIG. 4, the shank portion 220 may include a shank leading edge 222, a shank trailing edge 224, a shank suction side 226, and a shank pressure side 228. The shank leading edge 222 is proximate to the leading edge 60 of the airfoil 56, while the shank trailing edge 224 is offset from the trailing edge 62 of the airfoil 56. Additionally, the shank portion 220 may include a solid shank tail 230 that extends from the shank suction side 226 to the shank pressure side 228 proximate to the shank trailing edge 224. The shank portion 220 of the boss 216 may at least partially define a cavity 92 that extends into and is further defined in the shoulder portion 218 and the airfoil 56.

In various embodiments, the shoulder portion 218 may include a shoulder leading edge 232, a shoulder trailing edge 234, a shoulder suction side 236, and a shoulder pressure side 238. The shoulder leading edge 232 is proximate to the leading edge 60 of the airfoil 56 and is aligned with the shank leading edge 222, while the shoulder trailing edge 234 is proximate to the trailing edge 62 of the airfoil and is offset from the shank trailing edge 224. Additionally, the shoulder portion 218 may include a solid shoulder tail 240. The solid shoulder tail 240 may extend downstream of both the shank trailing edge 224 and the trailing edge 62 of the airfoil 56, such that the solid shoulder tail 240 defines a support surface 242. The support surface 242 may contact (and be brazedly coupled to) the radially inner surface of the outer platform 204 when the stator vane assembly 200 is constructed.

The boss 216 may be contoured generally similarly to the airfoil 56, but the boss 216 may be sized larger than the airfoil 56. In many embodiments, the boss 216 may define one or more undercut surfaces 244 that are generally planar (e.g., flat). The undercut surfaces 244 may extend along the shank portion 220 and/or the shoulder portion 218 of the boss 216. At least one of the retention pins 212 may extend through one or more of the undercut surfaces 244. The undercut surfaces 244 may advantageously provide for a more rigid connection between the platforms 202, 202 and the boss 216.

As shown in FIG. 4, the one or more retention pins 212 may include a leading edge pin 213, a trailing edge pin 214, and an inner retention pin 217. The leading edge pin 213 may extend through the outer boss 75 proximate the leading edge 60 of the airfoil 56. The leading edge pin 213 may be disposed on an undercut surface 244 proximate to the shank leading edge 222 (e.g., along the shank suction side 226). The trailing edge pin 214 may extend through the solid shank tail 230 of the shank portion 220 of the outer boss 75 proximate to the shank trailing edge 224. The inner retention pin 217 (or inner leading edge pin) may extend through the inner boss 73 proximate the leading edge 60 of the airfoil 56. The inner retention pin 217 may be disposed on an undercut surface 244.

Figure 5:
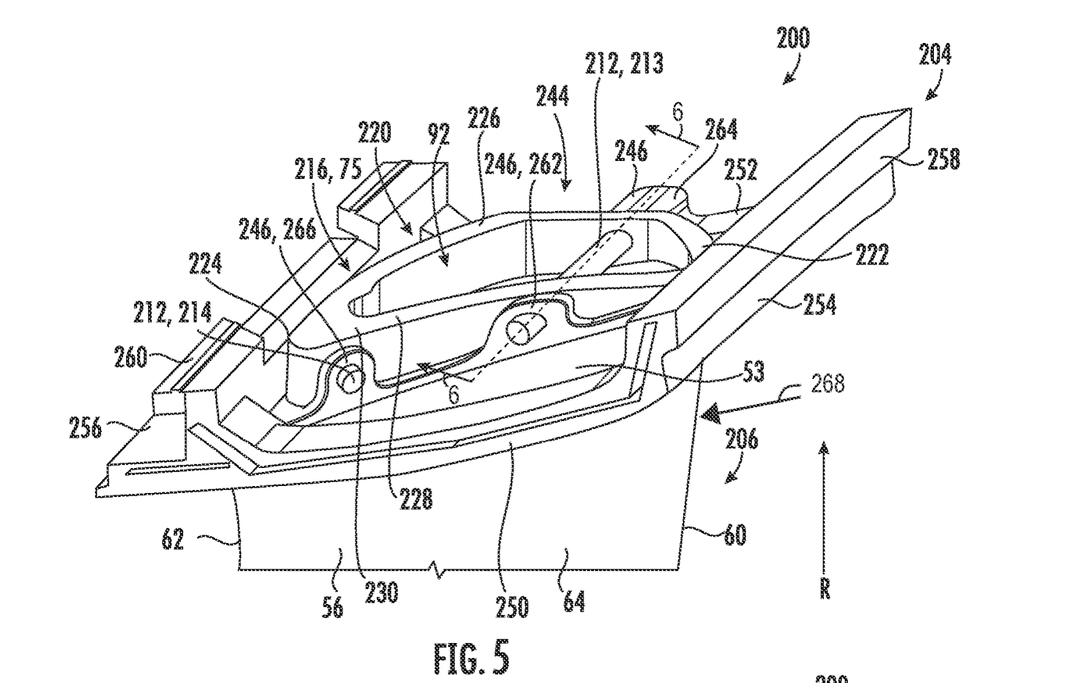
FIG. 5 illustrates a perspective view an outer portion of the stator vane assembly, including the airfoil segment and the outer platform in accordance with exemplary embodiments of the present disclosure.
Figure 7:
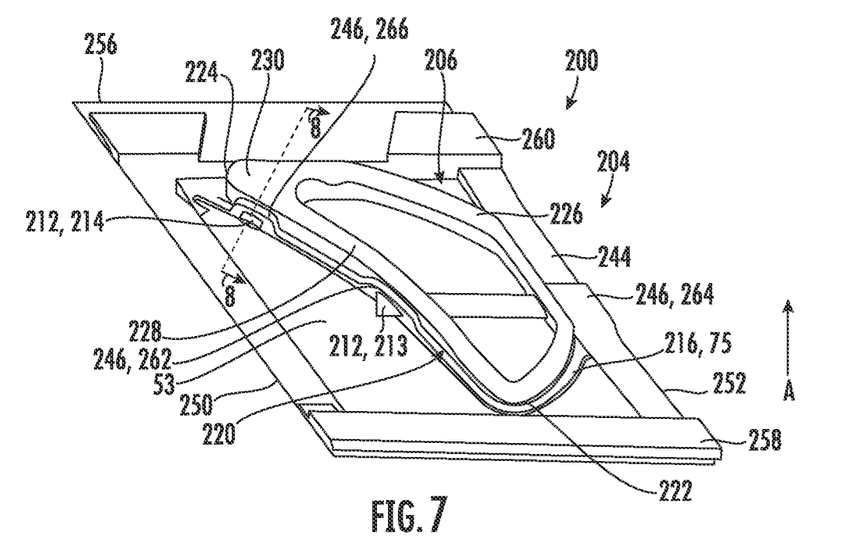
FIG. 7 illustrates a planar view of the stator vane assembly in accordance with exemplary embodiments of the present disclosure.
Figure 8:
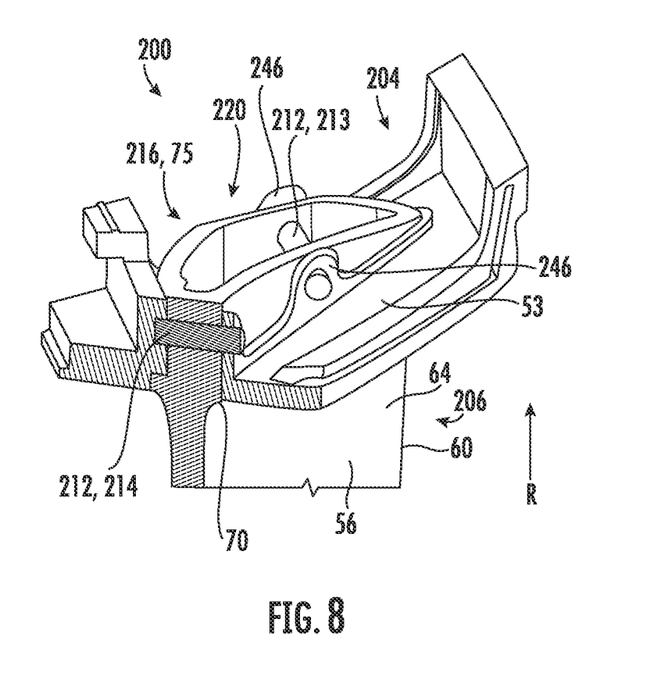
FIG. 8 illustrates a perspective cross-sectional view of the stator vane assembly from along the line 8-8 shown in FIG. 7 in accordance with exemplary embodiments of the present disclosure.
Figure 9:
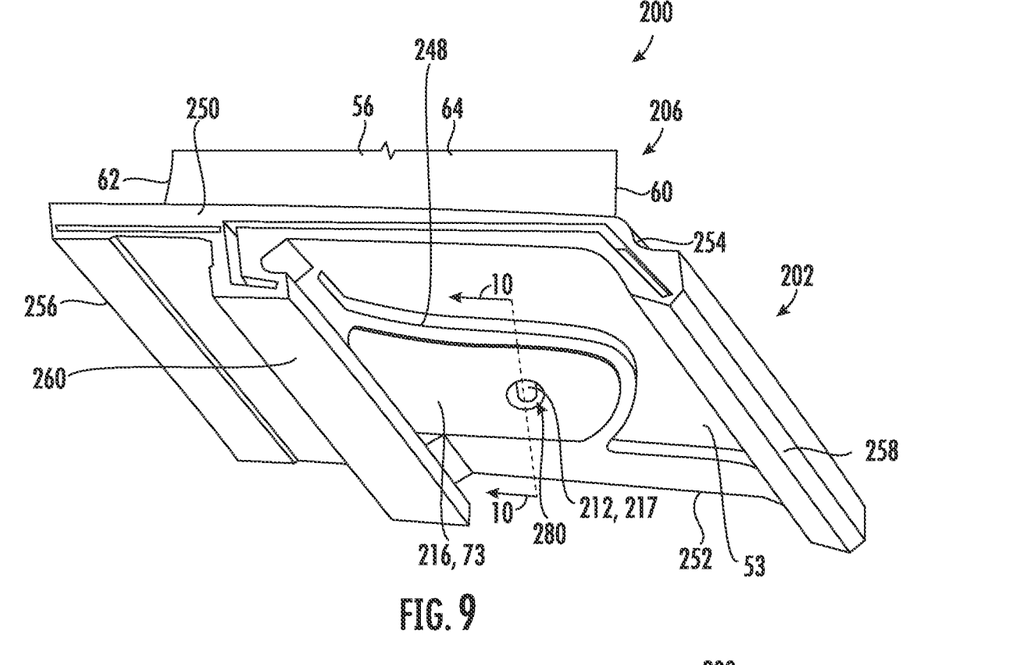
FIG. 9 illustrates a perspective view an inner portion of the stator vane assembly, including the airfoil segment and the inner platform in accordance with exemplary embodiments of the present disclosure.

Referring now to FIGS. 5-10, various views of a stator vane assembly 200 are illustrated in accordance with exemplary embodiments of the present disclosure. Particularly, FIG. 5 illustrates a perspective view of an outer portion of the stator vane assembly 200, including the airfoil segment 206 and the outer platform 204. FIG. 6 illustrates a perspective cross-sectional view of the stator vane assembly 200 from along the line 6-6 shown in FIG. 5. FIG. 7 illustrates a planar view of the stator vane assembly 200. FIG. 8 illustrates a perspective cross-sectional view of the stator vane assembly 200 from along the line 8-8 shown in FIG. 7. FIG. 9 illustrates a perspective view of an inner portion of the stator vane assembly 200, including the airfoil segment 206 and the inner platform 202. FIG. 10 illustrates a perspective cross-sectional view of the stator vane assembly 200 from along the line 10-10 shown in FIG. 9.

In FIGS. 5-10, the platforms 202, 204 may each include a floor 53 and one or more protrusions 80 extending radially from the floor 53. The one or more protrusions 80 may be generally perpendicular to the floor 53. In some embodiments, as shown in FIGS. 5-8, the one or more protrusions 80 may include a plurality of protrusions 246 spaced apart from one another and disposed about the boss 216 of the airfoil segment 206. Particularly, the outer platform 204 may include a plurality of protrusions 246 spaced apart from one another and disposed about the shank portion 220 of the boss 216, such that each protrusion 246 is in contact with the shank portion 220 of the boss 216. Each protrusion 246 of the plurality of protrusions 246 may define a hole through which a respective retention pin 212 extends. In other embodiments, as shown in FIGS. 9 and 10, the one or more protrusions 80 may be a continuous protrusion 248 that surrounds the boss 216. Particularly, the inner platform 202 may include a continuous protrusion 248 extending radially inwardly from the floor 53, such that the continuous protrusion 248 contacts inner boss 75.

The platforms 202, 204 may each include a pressure side slash face 250, a suction side slash face 252 opposite the pressure side slash face 250, a leading edge face 254, and a trailing edge face 256 opposite the leading edge face 254. The leading edge face 254 and the trailing edge face 256 may each extend between the pressure side slash face 250 and the suction side slash face 252. The suction side slash face 252 and the pressure side slash face 250 may contact neighboring stator vane assemblies 200 when positioned within the gas turbine. The suction side slash face 252 and the pressure side slash face 250 may be generally parallel to one another, and the leading edge face 254 and the trailing edge face 256 may be generally parallel to one another.

In many embodiments, the platforms 202, 204 may each include a leading edge hook rail 258 and a trailing edge hook 260 rail extending (e.g., radially) from the floor 53. The leading edge hook rail 258 may extend radially from the floor 53 at or proximate to the leading edge face 254. The trailing edge hook rail 260 may extend radially from the floor 53 at or proximate to the trailing edge face 256. The hook rails 258, 260 may extend generally parallel to the leading edge face 254 and the trailing edge face 256. The hook rails 258, 260 may be disposed on either side (e.g., forward and aft) of the shank portion 220 of the boss 216. The hook rails 258, 260 may attach to an adjacent shroud assembly, the casing of the turbine or compressor, or a stationary retention ring.

As shown in FIGS. 5-10, the one or more retention pins 212 may include a leading edge pin 213, a trailing edge pin 214, and an inner retention pin 217. The leading edge pin 213 may extend through the outer boss 75 proximate the leading edge 60 of the airfoil 56. The leading edge pin 213 may be disposed on an undercut surface 244, and the undercut surface 244 may be positioned on the shank suction side 226 of the shank portion 220. The trailing edge pin 214 may extend through the solid shank tail 230 of the shank portion 220 of the outer boss 75 proximate to the trailing edge 62 of the airfoil 56. The inner retention pin 217 (or inner leading edge pin) may extend through the inner boss 73 proximate to the leading edge 60 of the airfoil 56. The inner retention pin 217 may be disposed on an undercut surface 244.

As shown best in FIG. 6, the leading edge pin 213 may extend through a first protrusion 262 of the plurality of protrusions 246, the boss 216, and into a second protrusion 264 of the plurality of protrusions 246. The first protrusion 262 may extend from the floor 53 and may be disposed proximate to the leading edge hook rail 258 and/or proximate to the leading edge 60 of the airfoil 56. The second protrusion 264 may extend from the floor 53 and be disposed at (or proximate to) the suction side slash face 252. Particularly, the leading edge pin 213 may extend through the first protrusion 262, through the shank pressure side 228, across the cavity 92, through the shank suction side 226 (at the undercut surface 244), and into the second protrusion 264.

Additionally, regarding the leading edge pin 213, as shown best in FIG. 7, the leading edge pin 213 may be oriented generally perpendicular to the axial direction A of the gas turbine engine 10. Alternatively stated, the leading edge pin 213 may be oriented generally perpendicular to a flow direction 268 (FIG. 5) of fluid that engages the leading edge 60 of the airfoil 56. The aerodynamic loading on the airfoil 56, which is generally along the flow direction 268 (and/or the axial direction A), creates a building moment on the stator vane assembly 200. As such, orienting the leading edge pin 213 perpendicularly to the axial direction A and positioning the leading edge pin 213 proximate to the leading edge 60 advantageously allows the leading edge pin 213 to counteract the aerodynamic loading, thereby increasing the robustness (and overall hardware life) of the stator vane assembly 200.

Referring to FIGS. 7 and 8, the trailing edge pin 214 may extend through a third protrusion 266 of the plurality of protrusions 246, the solid shank tail 230, and into the trailing edge hook rail 260. The trailing edge pin 214 may be oriented to counteract the resulting moment from the leading edge pin 213. Particularly, the trailing edge pin 213 may be oriented oblique to the axial direction A and/or the flow direction 268.

Referring now to FIGS. 9 and 10, the inner retention pin 217 (or inner leading edge pin) may extend through the inner boss 73 proximate to the leading edge 60 of the airfoil 56. However, unlike the leading edge pin 213 and the trailing edge pin 214 at the outer platform 204, the inner retention pin 217 may not extend entirely through the continuous protrusion 248, such that at least one end of the retention pins 217 is housed within the protrusion 248. For example, the inner retention pin 217 may be installed through an opening in one side of the inner boss 73 and may extend through the inner boss 73 and into (but not through) the continuous protrusion 248 on the opposite side of the inner boss 73. The inner boss 73 may include an installation hole 280, which may permit the inner retention pin 217 to be installed in the manner depicted. The installation hole 280 may be oriented generally radially and defined in the inner boss 73. The inner retention pin 217 may be disposed on an undercut surface 244. The inner retention pin 217 may be oriented generally parallel to the leading edge pin 213 (e.g., generally perpendicular to the axial direction A).

In various embodiments, a metallurgical bond 211 may be disposed between and fixedly couple the platform 202, 204 to the respective boss 73, 75 of the airfoil segment 206. In many embodiments, the metallurgical bond 211 may extend annularly around (or surround) the shoulder portion 218 in order to bond the shoulder portion 218 of the bosses 73, 75 to a respective platform 202, 204. In exemplary embodiments, the metallurgical bond 211 may be a braze joint. In such embodiments, a braze material 107 may be disposed between the boss 216 and the boundary of the opening 102 (at both the inner and outer platforms 202 and 204). The entire stator vane assembly 200 may then be placed in a braze oven to melt the braze material 107, and subsequently the braze material 107 may solidify, thereby joining the inner and outer platforms 202 and 204 to a respective boss 216 of the airfoil segment 206. The braze material 107 may contain copper, nickel, silver, gold, aluminum, or other suitable braze metals.

In many embodiments, as shown in FIG. 6, the height 270 (e.g., a radial height) of the metallurgical bond 211 may be equal to (such as about 100%) or greater than (such as greater than 200% or greater than 300%) a thickness 272 of a wall 64, 66 of the airfoil 56. Particularly, for the connection between the outer boss 75 and the outer platform 204, the height 270 of the metallurgical bond 211 may be equal to (such as about 100%) or greater than (such as greater than 200% or greater than 300%) the thickness 272 of the wall 64, 66 of the airfoil 56 at about 90% span of the airfoil 56. Similarly, for the connection between the inner boss 73 and the inner platform 202, the height 270 of the metallurgical bond 211 may be equal to (such as about 100%) or greater than (such as greater than 200% or such as greater than 300%) the thickness 272 of the wall 64, 66 of the airfoil 56 at about 10% span of the airfoil 56.

As used herein, "% span" may refer to a position along a spanwise direction of the airfoil 56, which extends radially from the base 68 to the tip 70 of the airfoil 56. For example, 0% span may refer to the base 68 of the airfoil 56, 100% span may refer to the tip 70 of the airfoil 56, and 50% span may refer to a position halfway between the base 68 and the tip 70 of the airfoil 56. The height 270 of the metallurgical bond 211 being greater than 300% of the thickness 272 of the wall 64, 66 of the airfoil 56 advantageously ensures that the metallurgical bond 211 may be stronger (e.g., shear strength) than the wall 64, 66 of the airfoil 56, such that the wall 64, 66 would fail (if a failure were to occur) prior to the metallurgical bond 211.

Figure 11:
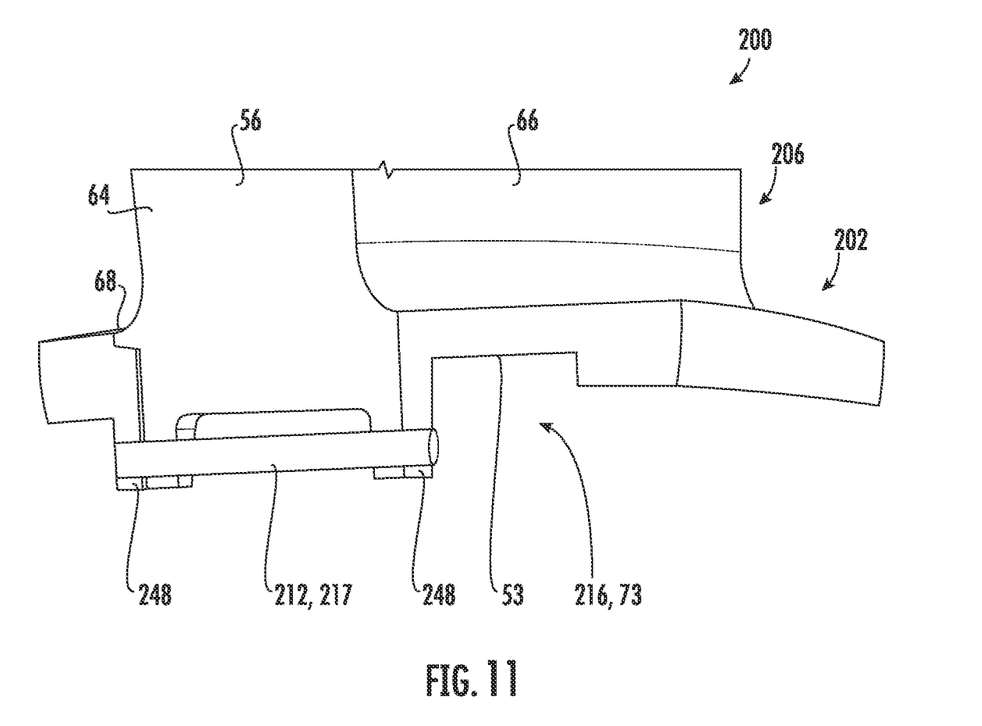
FIG. 11 illustrates a perspective cross-sectional view of the stator vane assembly in accordance with embodiments of the present disclosure.

Referring now to FIG. 11, a perspective cross-sectional view of the stator vane assembly 200, which depicts the connection between the inner boss 73 and the inner platform 202, is illustrated in accordance with an alternative embodiment of the present disclosure. As shown in FIG. 11, in some embodiments, the inner retention pin 217 may extend entirely through the continuous protrusion 248 on either side, such that both ends of the inner retention pin 217 are exposed. For example, the inner retention pin 217 may extend through the singular protrusion 248 at a first location, through the inner boss 73, and through the singular protrusion 248 at a second location different than the first location.

Forming the stator vane assembly 200 as three separate components advantageously increases the repairability of the stator vane assembly 200. For example, if a portion of the airfoil segment 206 is damaged, then the entire stator vane assembly 200 would not need to be replaced. Rather, the mechanical connection could be undone (e.g., by removing the one or more pins 212) to decouple the airfoil segment 206 from the platforms 202, 204, and a new airfoil segment 206 could be employed or the old airfoil could be repaired. Similarly, if an improvement to the airfoil segment cooling scheme is developed, the improved airfoil segment could be retrofitted into the existing platforms thereby improving turbine efficiency and minimizing manufacturing costs.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses (agent to complete this section once the claims are finalized):

A stator vane assembly comprising: a platform defining an opening; an airfoil segment having an airfoil and a boss, the airfoil including a leading edge, a trailing edge, a suction side wall, and a pressure side wall, the airfoil extending radially between a base and a tip, the boss extending from at least one of the base or the tip of the airfoil, the boss disposed in the opening of the platform; and a mechanical retention device coupling the platform to the boss of the airfoil segment.

The stator vane assembly as in any preceding clause, wherein a metallurgical bond is disposed between and fixedly couples the platform to the boss of the airfoil segment.

The stator vane assembly as in any preceding clause, wherein a height of the metallurgical bond is greater than about 300% of a thickness of one of the pressure side wall or the suction side wall.

The stator vane assembly as in any preceding clause, wherein the mechanical retention device includes one or more retention pins extending through the platform and the boss of the airfoil segment.

The stator vane assembly as in any preceding clause, wherein the one or more retention pins includes a leading edge pin and a trailing edge pin.

The stator vane assembly as in any preceding clause, wherein the boss includes a shoulder portion and a shank portion, the shoulder portion extending from and surrounding the at least one of the base or the tip of the airfoil, the shank portion extending radially from the shoulder portion.

The stator vane assembly as in any preceding clause, wherein the shank portion comprises a shank leading edge, a shank trailing edge, a shank suction side, and a shank pressure side, and wherein the shank portion comprises a solid shank tail extending from the shank suction side to the shank pressure side proximate to the trailing edge.

The stator vane assembly as in any preceding clause, wherein a leading edge pin extends through the platform, the shank pressure side, and the shank suction side proximate to the leading edge, and wherein a trailing edge pin extends through the platform and the solid shank tail.

The stator vane assembly as in any preceding clause, wherein the platform comprises a floor and one or more protrusions extending radially from the floor, and wherein the mechanical retention device couples one of the one or more protrusions of the platform to the boss of the airfoil segment.

The stator vane assembly as in any preceding clause, wherein the platform comprises a pressure side slash face, a suction side slash face, a leading edge face, and a trailing edge face, the leading edge face and the trailing edge face each extending between the pressure side slash face and the suction side slash face; and wherein the platform comprises a leading edge hook rail and a trailing edge hook rail extending from the floor.

The stator vane assembly as in any preceding clause, wherein the mechanical retention device is a leading edge pin that extends through a first protrusion of the one or more protrusions, the boss, and into a second protrusion of the one or more protrusions, the second protrusion of the one or more protrusions being disposed at the pressure side slash face.

The stator vane assembly as in any preceding clause, wherein the mechanical retention device is a trailing edge pin that extends through a first protrusion of the one or more protrusions, the solid shank tail, and into the trailing edge hook rail.

The stator vane assembly as in any preceding clause, wherein the platform defining an opening is an outer platform, and the boss extending from at least one of the base or the tip of the airfoil is a first boss extending from the tip of the airfoil; and wherein the stator vane assembly further comprises an inner platform defining an inner platform opening, and a second boss extends from the base of the airfoil and is coupled to the inner platform by an inner retention pin.

A turbomachine defining an axial direction, a radial direction, and a circumferential direction, the turbomachine comprising: a compressor section; a combustion section downstream of the compressor section; and a turbine section downstream of the combustion section, wherein at least one of the compressor section or the turbine section includes a stator vane assembly, the stator vane assembly comprising: a platform defining an opening; an airfoil segment having an airfoil and a boss, the airfoil including a leading edge, a trailing edge, a suction side wall, and a pressure side wall, the airfoil extending radially between a base and a tip, the boss extending from at least one of the base or the tip of the airfoil, the boss disposed in the opening of the platform; and a mechanical retention device coupling the platform to the boss of the airfoil segment.

The turbomachine as in any preceding clause, wherein a metallurgical bond is disposed between and fixedly couples the platform to the boss of the airfoil segment.

The turbomachine as in any preceding clause, wherein the mechanical retention device includes one or more retention pins extending through the platform and the boss of the airfoil segment.

The turbomachine as in any preceding clause, wherein the one or more retention pins includes a leading edge pin and a trailing edge pin; and wherein the leading edge pin is oriented generally perpendicular to the axial direction.

The turbomachine as in any preceding clause, wherein the boss includes a shoulder portion and a shank portion, the shoulder portion extending from and surrounding the at least one of the base or the tip of the airfoil, the shank portion extending radially from the shoulder portion and comprising a shank leading edge, a shank trailing edge, a shank suction side, and a shank pressure side, and wherein the shank portion comprises a solid shank tail extending from the shank suction side to the shank pressure side proximate to the trailing edge.

The turbomachine as in any preceding clause, wherein the mechanical retention device comprise a leading edge pin and a trailing edge pin, the leading edge pin extending through the platform, the shank pressure side, and the shank suction side proximate to the shank leading edge, and the trailing edge pin extending through the platform and the solid shank tail.

The turbomachine as in any preceding clause, wherein the platform defining an opening is an outer platform, and the boss extending from at least one of the base or the tip of the airfoil is a first boss extending from the tip of the airfoil; and wherein the stator vane assembly further comprises an inner platform defining an inner platform opening, and a second boss extends from the base of the airfoil and is coupled to the inner platform by an inner retention pin.

What is claimed is:

1. A stator vane assembly comprising:
   a platform defining an opening;
   an airfoil segment having an airfoil and a boss, the airfoil including a leading edge, a trailing edge, a suction side wall, and a pressure side wall, the airfoil extending radially between a base and a tip, the boss extending from at least one of the base or the tip of the airfoil, the boss disposed in the opening of the platform; and
   a mechanical retention device coupling the platform to the boss of the airfoil segment, wherein the mechanical retention device includes one or more retention pins extending through the platform and the boss of the airfoil segment, and wherein the one or more retention pins includes a leading edge pin and a trailing edge pin.

2. The stator vane assembly as in claim 1, wherein a metallurgical bond is disposed between and fixedly couples the platform to the boss of the airfoil segment.

3. The stator vane assembly as in claim 2, wherein a height of the metallurgical bond is greater than about 300% of a thickness of one of the pressure side wall or the suction side wall.

4. The stator vane assembly as in claim 1, wherein the boss includes a shoulder portion and a shank portion, the shoulder portion extending from and surrounding the at least one of the base or the tip of the airfoil, the shank portion extending radially from the shoulder portion.

5. The stator vane assembly as in claim 4, wherein the shank portion comprises a shank leading edge, a shank trailing edge, a shank suction side, and a shank pressure side, and wherein the shank portion comprises a solid shank tail extending from the shank suction side to the shank pressure side proximate to the trailing edge.

6. The stator vane assembly as in claim 5, wherein the leading edge pin extends through the platform, the shank pressure side, and the shank suction side proximate to the leading edge, and wherein the trailing edge pin extends through the platform and the solid shank tail.

7. The stator vane assembly as in claim 1, wherein the platform comprises a floor and one or more protrusions extending radially from the floor, and wherein the mechanical retention device couples one of the one or more protrusions of the platform to the boss of the airfoil segment.

8. The stator vane assembly as in claim 7, wherein the platform comprises a pressure side slash face, a suction side slash face, a leading edge face, and a trailing edge face, the leading edge face and the trailing edge face each extending between the pressure side slash face and the suction side slash face; and wherein the platform comprises a leading edge hook rail and a trailing edge hook rail extending from the floor.

9. The stator vane assembly as in claim 8, wherein the leading edge pin extends through a first protrusion of the one or more protrusions, the boss, and into a second protrusion of the one or more protrusions, the second protrusion of the one or more protrusions being disposed at the pressure side slash face.

10. The stator vane assembly as in claim 8, wherein the trailing edge pin extends through a first protrusion of the one or more protrusions, the shank portion, and into the trailing edge hook rail.

11. The stator vane assembly as in claim 1, wherein the platform defining an opening is an outer platform, and the boss extending from at least one of the base or the tip of the airfoil is a first boss extending from the tip of the airfoil; and wherein the stator vane assembly further comprises an inner platform defining an inner platform opening, and a second boss extends from the base of the airfoil and is coupled to the inner platform by an inner retention pin.

12. A turbomachine defining an axial direction, a radial direction, and a circumferential direction, the turbomachine comprising:
- a compressor section;
- a combustion section downstream of the compressor section; and
- a turbine section downstream of the combustion section, wherein at least one of the compressor section or the turbine section includes a stator vane assembly, the stator vane assembly comprising:
  - a platform defining an opening;
  - an airfoil segment having an airfoil and a boss, the airfoil including a leading edge, a trailing edge, a suction side wall, and a pressure side wall, the airfoil extending radially between a base and a tip, the boss extending from at least one of the base or the tip of the airfoil, the boss disposed in the opening of the platform, wherein the boss includes a shoulder portion and a shank portion, the shoulder portion extending from and surrounding the at least one of the base or the tip of the airfoil, the shank portion extending radially from the shoulder portion and comprising a shank leading edge, a shank trailing edge, a shank suction side, and a shank pressure side, and wherein the shank portion comprises a solid shank tail extending from the shank suction side to the shank pressure side proximate to the trailing edge; and
  - a mechanical retention device coupling the platform to the boss of the airfoil segment.

13. The turbomachine as in claim 12, wherein a metallurgical bond is disposed between and fixedly couples the platform to the boss of the airfoil segment.

14. The turbomachine as in claim 12, wherein the mechanical retention device includes one or more retention pins extending through the platform and the boss of the airfoil segment.

15. The turbomachine as in claim 14, wherein the one or more retention pins includes a leading edge pin and a trailing edge pin; and wherein the leading edge pin is oriented generally perpendicular to the axial direction.

16. The turbomachine as in claim 12, wherein the mechanical retention device comprise a leading edge pin and a trailing edge pin, the leading edge pin extending through the platform, the shank pressure side, and the shank suction side proximate to the shank leading edge, and the trailing edge pin extending through the platform and the solid shank tail.

17. The turbomachine as in claim 12, wherein the platform defining an opening is an outer platform, and the boss extending from at least one of the base or the tip of the airfoil is a first boss extending from the tip of the airfoil; and wherein the stator vane assembly further comprises an inner platform defining an inner platform opening, and a second boss extends from the base of the airfoil and is coupled to the inner platform by an inner retention pin.

18. A stator vane assembly comprising:
- a platform defining an opening, wherein the platform comprises a floor and one or more protrusions extending radially from the floor, wherein the platform comprises a pressure side slash face, a suction side slash face, a leading edge face, and a trailing edge face, the leading edge face and the trailing edge face each extending between the pressure side slash face and the suction side slash face, and wherein the platform comprises a leading edge hook rail and a trailing edge hook rail extending from the floor;
- an airfoil segment having an airfoil and a boss, the airfoil including a leading edge, a trailing edge, a suction side wall, and a pressure side wall, the airfoil extending radially between a base and a tip, the boss extending from at least one of the base or the tip of the airfoil, the boss disposed in the opening of the platform; and
- a mechanical retention device coupling the platform to the boss of the airfoil segment, wherein the mechanical retention device couples one of the one or more protrusions of the platform to the boss of the airfoil segment.

* * * * *